(12) United States Patent
Cheng (10) Patent No.: US 10,872,127 B2
(45) Date of Patent: Dec. 22, 2020

(54) METHOD AND SYSTEM OF PROVIDING FOR CROSS-DEVICE OPERATIONS BETWEEN USER DEVICES

(71) Applicant: NEC Laboratories Europe GmbH, Heidelberg (DE)

(72) Inventor: Bin Cheng, Sandhausen (DE)

(73) Assignee: NEC CORPORATION, Tokyo (JP)

( * ) Notice: Subject to any disclaimer, the term of this patent is extended or adjusted under 35 U.S.C. 154(b) by 222 days.

(21) Appl. No.: 16/039,367

(22) Filed: Jul. 19, 2018

(65) Prior Publication Data

US 2018/0329972 A1 Nov. 15, 2018

Related U.S. Application Data

(63) Continuation of application No. 14/419,488, filed as application No. PCT/EP2013/066840 on Aug. 12, 2013, now Pat. No. 10,061,829.

(30) Foreign Application Priority Data

Aug. 10, 2012 (EP) .................................... 12180142

(51) Int. Cl.
*G06F 16/957* (2019.01)
*H04L 29/08* (2006.01)
(Continued)

(52) U.S. Cl.
CPC ...... *G06F 16/9577* (2019.01); *G06F 11/0706* (2013.01); *G06F 11/0769* (2013.01); *G06F 16/2246* (2019.01); *G06F 16/275* (2019.01); *H04L 63/08* (2013.01); *H04L 67/02* (2013.01); *H04L 67/1095* (2013.01);
(Continued)

(58) Field of Classification Search
CPC ............. G06F 16/9577; G06F 11/0706; G06F 11/0769; G06F 11/32; H04L 67/28; H04L 67/2823; H04L 67/2828
See application file for complete search history.

(56) References Cited

U.S. PATENT DOCUMENTS 7,072,984 B1 7/2006 Polonsky et al.
7,337,392 B2 2/2008 Lue
(Continued)

OTHER PUBLICATIONS

U.S. Appl. No. 14/419,488, filed Feb. 4, 2015.

*Primary Examiner* — Kyung H Shin
(74) *Attorney, Agent, or Firm* — Leydig, Voit & Mayer, Ltd.

(57) ABSTRACT

A method of providing for cross-device operations between user devices includes maintaining, using an intermediate device connected to the user devices, state information on different elements in different sub-views displayed respectively on first and second ones of the user devices. The first and second user devices are different from each other. The method further includes performing: migrating and synchronizing the state of one of the elements which is moved from the sub-view of the first user device to the sub-view of the second user device; and/or generating a shadow element on the sub-view of the second user device and linking the shadow element to one of the elements on the first user device which is duplicated from the sub-view of the first user device on the sub-view of the second user device, and updating the states of the linked elements.

18 Claims, 8 Drawing Sheets

(51) Int. Cl.
*G06F 16/27* (2019.01)
*G06F 16/22* (2019.01)
*G06F 11/07* (2006.01)
*H04L 29/06* (2006.01)

(52) U.S. Cl.
CPC .......... *H04L 67/28* (2013.01); *H04L 67/2823* (2013.01); *H04L 67/2842* (2013.01); *H04M 2203/554* (2013.01)

(56) References Cited

U.S. PATENT DOCUMENTS

| | | |
|---|---|---|
| 2003/0229900 A1 | 12/2003 | Reisman |
| 2008/0109477 A1 | 5/2008 | Lue |
| 2008/0139191 A1* | 6/2008 | Melnyk ............... G06F 16/9577 455/419 |
| 2009/0282125 A1 | 11/2009 | Jeide et al. |
| 2011/0078604 A1* | 3/2011 | Wilhelm ............. G06F 11/0769 715/771 |
| 2011/0219419 A1 | 9/2011 | Reisman |
| 2011/0258538 A1 | 10/2011 | Liu et al. |
| 2012/0260157 A1 | 10/2012 | Zhu et al. |
| 2012/0284290 A1 | 11/2012 | Keebler et al. |
| 2013/0159547 A1 | 6/2013 | Miyao |

\* cited by examiner

METHOD AND SYSTEM OF PROVIDING FOR CROSS-DEVICE OPERATIONS BETWEEN USER DEVICES

CROSS-REFERENCE TO PRIOR APPLICATIONS

This application is a continuation application of U.S. application Ser. No. 14/419,488 filed on Feb. 4, 2015, which is a U.S. National Phase application under 35 U.S.C. § 371 of International Application No. PCT/EP2013/066840, filed on Aug. 12, 2013, and claims benefit to European Patent Application No. EP 12180142.7, filed on Aug. 10, 2012. The International Application was published in English on Feb. 13, 2014 as WO 2014/023851 under PCT Article 21(2).

FIELD

The present invention relates to a method and system of providing for cross-device operations between user devices, wherein the user devices have different sub-views displaying content from an application server.

BACKGROUND

Nowadays a plurality of types of user devices like smart phones, tablets, personal computers and televisions may be used by a user. In such a multi-user device world for example a user might read news from his smart phone on the road to the office, check e-mails from his personal computer in his office, read weather news on the digital display in a train or bus station and watch online videos on his television and/or his tablet when he is at home. Digital content is presented in different applications on different devices.

For a user however it is desirable to support applications which can be used on different user devices. However different user devices usually have different platforms and different screens and therefore application developers have to consider how to make a code cross-platform and how to make the applications adapt to multiple user devices.

One conventional way to solve this problem is to use web applications which are now gaining more and more attraction because of its "write once, deploy everywhere"-feature. Other applications are built using the unified script languages like HTML, JavaScript, CSS and run and top of a browser's run-time environment enabling applications running across multiple platforms. Any content provider, like Financial Time and New York Time, have already stopped their native applications on different user devices and launch their web applications to offer cross-device news reading experience.

However cross-platform applications are still restricted in terms of multi-device usage. As users are moving from one user device to another user device or use multiple user devices together, users expect their web applications to integrate into a consistent and seamless experience across multiple user devices. For example when a user is moving from one room to another room and talking to friend online he expects to have a seamless video chatting experience as he is shifting his user device from smart phone to tablet or laptop.

Another example is that when a user is watching television at home while using a tablet to talk with his friends through an online social network. He expects to use his tablet as a so called "companion" user device to control a content on his television. For example he would like to switch television channels without leaving his tablet. An even further example is collaboration of user devices: When for example three users are located in different places and each of them has a personal user device, they might wish to use the same web application together, for example, co-browsing the same web page or co-viewing the same online photo album. They might also like to share their interactions with others on multiple user devices collaboratively.

The above-mentioned operations or principles like device shifting, "companion" of devices and device collaboration are not possible with conventional methods and systems. Conventionally the same code base for applications is converted in different versions each of which is suitable or adapted for a different type of user device. Based in the conventional frame work for a single user with two user devices the same application can run on both user devices but runs in a separate way. No cross-device sharing and collaboration is possible.

In US 2003/0229900 A1 systems and methods for navigating hyper media using multiple coordinated input/output devices are shown. On each device, for example a television set, a personal digital assistant or a smartphone, an application is run separately and device states may be exchanged or updates between those devices.

In U.S. Pat. No. 7,337,392 B2 a method is shown for generating a minimum set of simplified and navigable web contents from the single web document which is oversized for targeted smaller devices. In particular a request for HTTP content is issued by user device and transmitted via a HTTP handler or web server. The web server returns the document to the HTTP handler parsing the content running on a content device. The content device generates a set of hyperlinked and simplified document partitions resulting in a "condensed" content suitable for a smaller device. Then the condensed content is prepared via HTML transcoder and HTTP handler then returns the simplified condensed content to the smaller device.

SUMMARY

In an embodiment, the present invention provides a method of providing for cross-device operations between user devices. The method includes maintaining, using an intermediate device connected to the user devices, state information on different elements in different sub-views displayed respectively on first and second ones of the user devices. The first and second user devices are different from each other. The method further includes performing at least one of: migrating and synchronizing the state of one of the elements which is moved from the sub-view of the first user device to the sub-view of the second user device, or generating a shadow element on the sub-view of the second user device and linking the shadow element to one of the elements on the first user device which is duplicated from the sub-view of the first user device on the sub-view of the second user device, and updating the states of the linked elements.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

In an embodiment, the present invention provides a method and system supporting cross-device operations for multi-device applications.

In an embodiment, the present invention also provides a method and a system being more flexible in terms of seamless user experience across multiple user devices.

In an embodiment, the present invention further provides a method and a system which can be easily implemented.

In an embodiment, the present invention even further provides a method and a system enabling an increased level of quality of experience for users when using applications across different user devices.

According to an embodiment, a method for providing content for user devices is defined, wherein the user devices are connected to an application server via an intermediate device.

The method according to an embodiment includes the steps of
  a) Requesting content by one or more of the user devices from the intermediate device,
  b) Fetching the requested content by the intermediate device,
  c) Executing the content by the intermediate device,
  d) Generating based on the executed content a content tree,
  e) Splitting the generated content tree into content sub trees for each user device,
  f) Providing the respective content sub tree to the respective user device, and
  g) Updating the content tree and/or content sub-trees in case of a content change on at least one user device.

A system for providing content for user devices is defined, wherein the user device is connected to an application server via an intermediate device, configured to perform the methods according to the embodiments of the present invention.

The system includes user devices configured to request content from the intermediate device, to receive content sub tress and to present the received content of a received content sub tree by each of the respective user devices. The system further includes an intermediate device configured to fetch the requested content, to execute the content to generate based on the executed content a content tree, to split the generated content tree into content sub trees for each user device, to provide the respective content sub tree to the respective user device and to update the content tree and/or content sub trees in case of a content change on at least one user device.

According to an embodiment of the invention, it has been recognized that cross-device operations for multi-device applications are supported.

According to an embodiment of the invention, it has been further recognized that multi-device applications can be easily developed or existing web applications may be easily supported to a multi-device supported version.

According to an embodiment of the invention, it has been further recognized that an enhanced level of quality of experience for users is provided when using multiple different user devices.

According to an embodiment of the invention, the "built once, run everywhere" feature is provided, preferably suitable in the areas of mobile devices and televisions.

According to an embodiment of the invention, it has been further recognized that a flexible application frame work enabling a large number of multi-device web applications can be provided.

According to an embodiment of the invention, it has been further recognized that it is feasible for the system to build up.

In other words, according to an embodiment of the present invention, in particular the intermediate device running between the application server and a plurality of user devices, enable, preferably automatically and intelligently the split of a content tree, for example of a single web page, into multiple sub content trees each of which represents the sub-view of a whole web page on a particular user device. This enables for example web application developers to deal with multiple user devices in a single virtualized web page rather than multiple separated web pages and also the content on end users multiple user devices are connected for example within the intermediate device. In particular, the intermediate device centralizes a logical execution flow and content update from multiple content trees on multiple user devices into a single content tree within a corresponding environment on the intermediate device so that the cross-device operations for web applications like pairing multiple devices, moving elements from one device to another device and synchronizing user interactions across devices are enabled.

According to a preferred embodiment, the intermediate device processes reported events of user devices and updates the content sub trees according to the processed events. This enables an easy implementation of centralizing of content updates and user events causing content changes in case the user triggers different events on different user devices.

According to a further preferred embodiment, the intermediate device and/or the application server is deployed in a cloud system and/or at a smart home gateway. When being deployed in a cloud system or at a smart home gateway accessing the intermediate device and/or the application server may be enabled from nearly everywhere. Additionally when being deployed at a smart home gateway the "bottleneck" which is usually a bandwidth of the connection between the smart home gateway and the internet provider is not burdened with additional traffic. For example, the application server can fetch content from the internet and the intermediate device together with the application server can prepare and provide the requested content of one of the user device centralized for complete local area network of the users home for each of the user's user devices.

According to a further preferred embodiment, the user devices are authenticated with the intermediate device by a session information. This enables a fast a reliable authentication of a user device to the intermediate device.

According to a further preferred embodiment, the session information, preferably a session key, is generated for the first user device connecting to the intermediate device and the other user devices are provided with the generated session information for joining the session. This enables a plurality of devices to easily join the session opened or initiated by the first user device.

According to a further preferred embodiment, an authentication service is used, preferably a social network for authentication of a user device. The user when using a social network as authentication service does not have to use separate user names and passwords for a dedicated authentication service but can use his already present account on the social network, for example Facebook, Google+, etc. as well as e-mail accounts or the like. If joined multiple user devices belong to more than one user, for example group of users, those users may have to share the same session information and authentication information with each other.

According to a further preferred embodiment, an application list is transmitted to the user devices and presented to users for application selection. For example after user devices have joined a session, the list of all available applications is provided to the users. Then the user can choose which available applications he would like to use. This enables the user in a flexible way to choose which application(s) he prefers.

According to a further preferred embodiment, the content tree comprises a header section and one or more device sections representing sub-views of the content tree for the user devices. This provides a reliable and easy processing of the content tree by the intermediate device, for example when updating one of the device sections when resolution on a user device changes or the like.

According to a further preferred embodiment, sub-views are adapted according to a view specification for each type of user device, preferably wherein the view specification is included in the header section. This enables for example a view adapter to decide in an easy and fast way which sub-view goes to which user device. Further such a view adapter may take into account a view specification: For example the view specification tells the view adapter to only show the first section if only one user device is available and to combine the second and third section on one user device if two user devices are available. Therefore sub-views may be handled in a flexible way.

According to a further preferred embodiment, sub-views are rendered on the respective user devices. This avoids rendering of the sub-views on the intermediate device which would result in a higher resource consumption on the intermediate device as well as an increased data traffic between the intermediate device and the user devices for presentation.

According to a further preferred embodiment, to move an element of a first user device to a second user device, the element is moved from the sub-view of the first user device to the sub-view of the second user device and the state of the moved element is migrated and synchronized. This enables in an easy way to move elements between different user devices.

According to a further preferred embodiment, to duplicate an element of a first user device on a second user device, a shadow element is generated and linked to the element on the first user device, wherein the intermediate device updates any state change of the linked elements. This provides in an easy way to duplicate elements originating from a first device and appearing further on a second device. For example the shadow element is created in the second user device and a new mapping is built up from the original element to the shadow element. The original element and the shadow element may then share the same identification information and the intermediate device may then use this identity information as the link to propagate any update associated with this/these element/elements.

According to a further preferred embodiment, to broadcast an element of a first user device to a plurality of second user devices, the element of the first user device is duplicated in each of the second user devices. Therefore broadcasting of an element is performed by performing duplicating an element on the original element and each of the other user devices. Therefore broadcasting can be easily implemented based on the duplicating procedure.

According to a further preferred embodiment, in case after a temporal breakdown of a user device, the state of the elements on the user device is synchronized, preferably wherein a session is rejoined by transmitting the session information from the intermediate device to the user device after breakdown. This enables to easily recover the state of an element or elements on a user device when the user uses the same user device to rejoin the same sub-view after a certain time of interruption. The term "breakdown" is to be meant in the most general sense, i.e. any time or period of connection interruption between the user equipment and the intermediate device, According to a further preferred embodiment, view information of a user device is transmitted to the intermediate device for determining which sub-view is used for each of the user devices. View information for example include properties of a user device like resolution, etc. for presenting content. A view adapter for example may then decide which sub-view goes to which device initially according to the view specification and the view information of a user device.

According to a further preferred embodiment, the content trees and content-sub-trees are organized as document object model trees. This provides a well known and reliable structure for presenting content on user devices.

Figure 1:
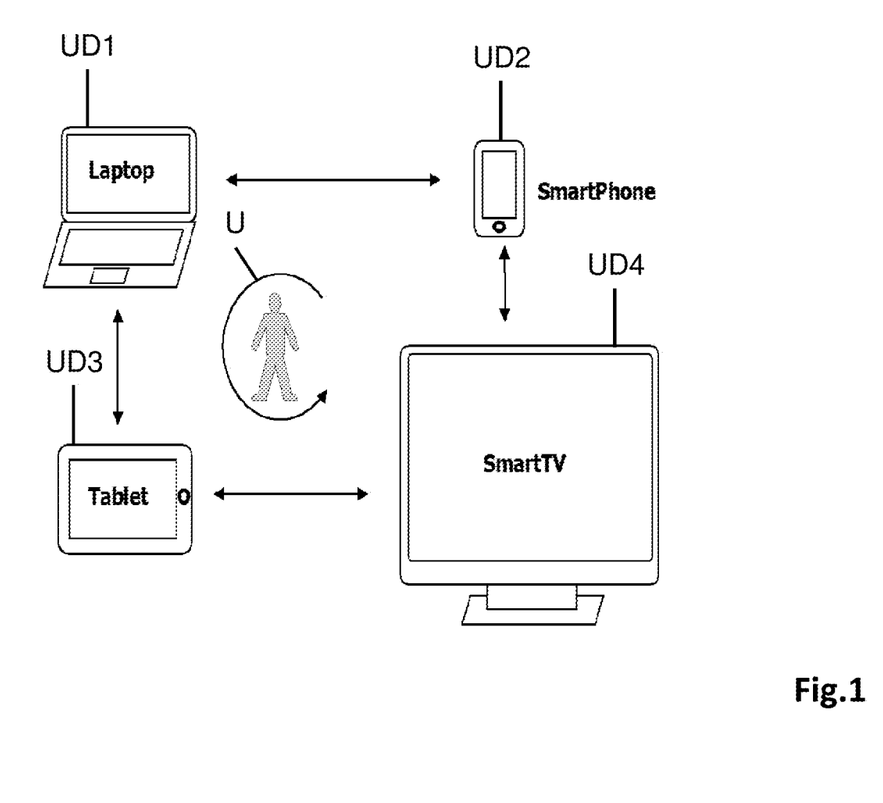
FIG. 1 illustrates a conventional multi-device environment.

FIG. 1 shows a conventional multi-device environment.

In FIG. 1, a diagram of a multi-device environment is shown. The user U is surrounded in a multi-device "world" by for example a laptop UD1, a smartphone UD2, a tablet UD3 and a smart television UD4. For example the user U would like to read the news from his Smartphone UD2 on the road to his office, check emails from his laptop UD1 in his office, read the weather forecast on the digital display in a train station and watch online video on his smart television UD4 and/or on his tablet UD3 at home.

Figure 2:
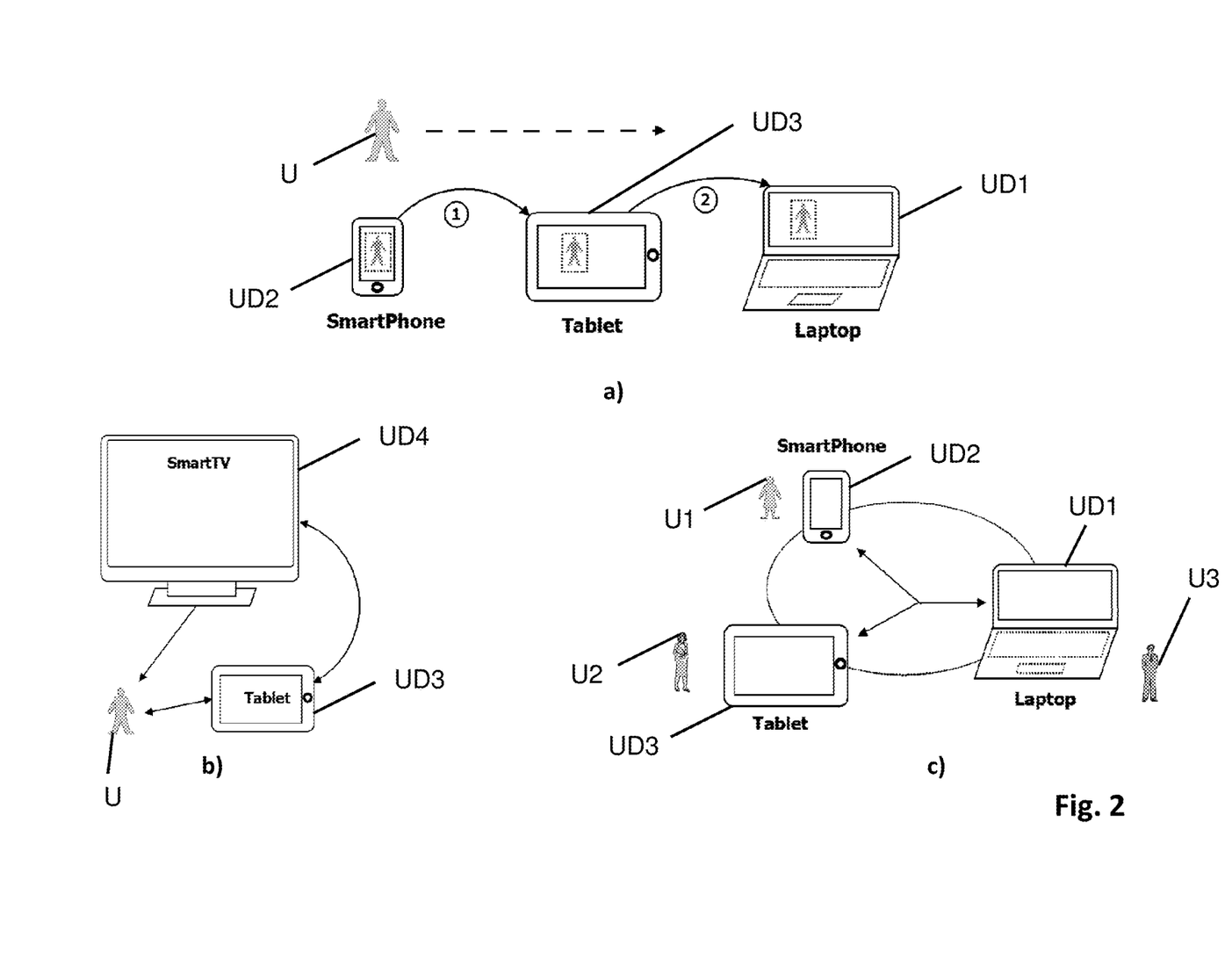
FIG. 2a illustrates a conventional user device shifting.
FIG. 2b illustrates a conventional companioning user device.
FIG. 2c illustrates a conventional user device collaboration.

FIG. 2a shows a conventional user device shifting.

In FIG. 2a, device shifting for seamless video chatting is shown. When a user U is moving for example from one room to another room when he is talking to a friend via his smartphone UD2 he expects to have a seamless video chatting experience as he is shifting his user device from his smartphone UD2 via his tablet UD3 to his laptop UD1.

FIG. 2b shows a conventional companioning user device.

In FIG. 2b, a companion device for multi-screen television viewing is shown. When a user U is watching television with his smart television UD4 at home while using his tablet UD3 to talk with his friends though an online social network for example he would like to use his tablet UD3 as a companion device to control the content on his smart television UD4. For instance, he would like to switch television channels on his smart television UD4 without leaving his tablet UD3.

FIG. 2c shows a conventional user device collaboration.

In FIG. 2c, a device collaboration between different user devices UD1-UD3 for co-browsing is shown. For example three users U1, U2, U3 are located on different places and each of them has a personal device UD2, UD3 and UD1 for the respective users U1, U2, U3. If they wish to use the same web application together, for example co-browsing the same web page or co-visiting the same online photo album may expect to share their interactions with others on multiple user devices UD1, UD2, UD3 in a collaborative way.

Figure 3:
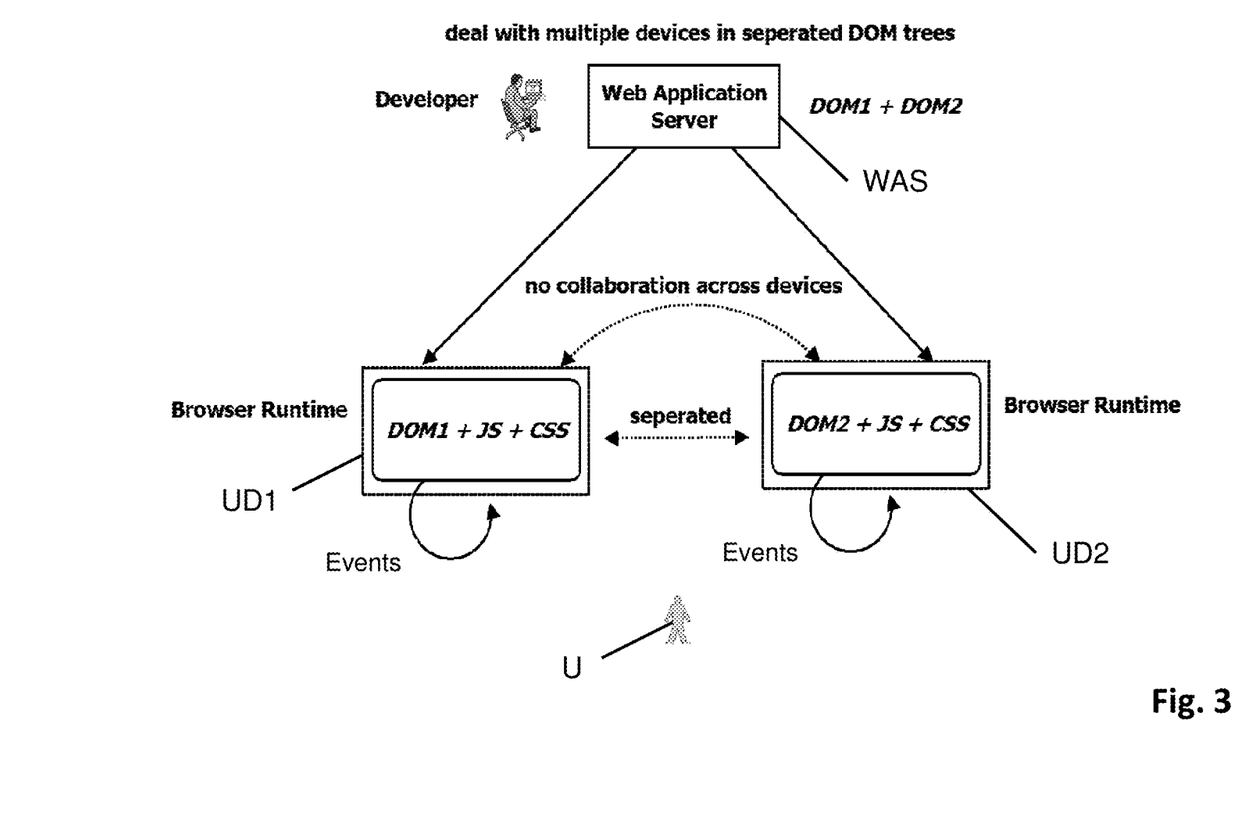
FIG. 3 illustrates a conventional method for presenting content on user devices.

FIG. 3 shows a conventional method for presenting content on user devices.

In FIG. 3, an illustration of a conventional method respectively conventional system is shown. An application developer converts the same codebase into different versions each of which is suitable for a different type of user device UD1, UD2. Based on the conventional framework for a single user U to user devices UD1, UD2, the same application can run on both user devices UD1, UD2, but runs in a separate way. A web application server WAS creates a separate document object model DOM1 and DOM2 for each user device UD1, UD2 and no collaboration across the user devices UD1, UD2 is established for this user U. On the user device UD1 respectively on the user device UD2 a browser runtime environment is executed using the created document object model DOM1 respectively document object model DOM2, JavaScript plus cascading style sheets CSS together with events occurred on the respective user device UD1, UD2. There is no collaboration between or across these two user devices UD1, UD2; they are separated.

Figure 4:
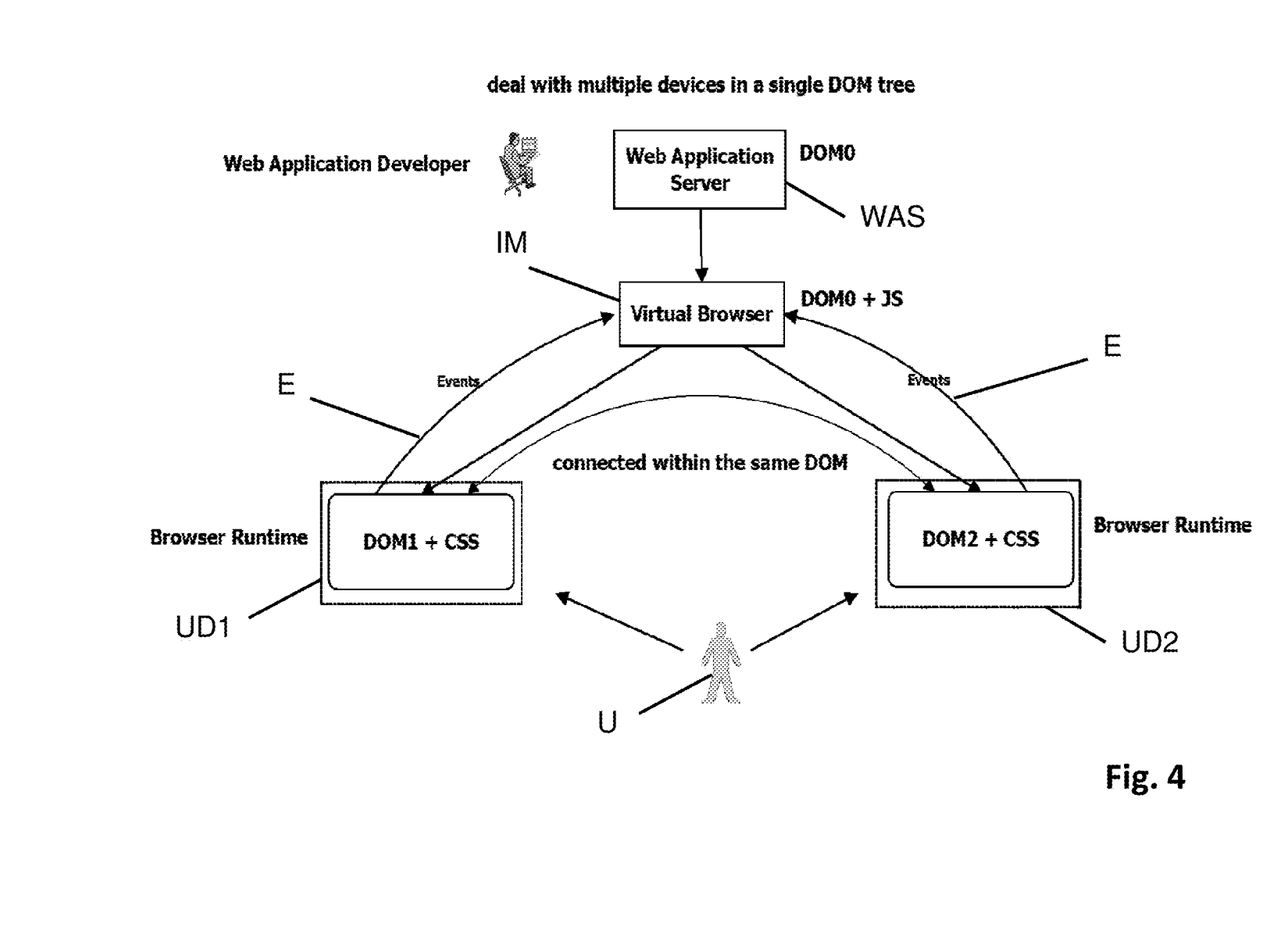
FIG. 4 illustrates a method for presenting content according to a first embodiment of the present invention.

FIG. 4 shows a method for presenting content according to a first embodiment of the present invention.

FIG. 4 shows a so called virtual-browser as intermediate device IM. The virtual browser fetches a web page from a web application server WAS and uses its own JavaScript engine JS to execute the JavaScript code embedded in this web page to generate a single DOM tree DOM0. Then the virtual browser splits the generated DOM0 tree into multiple sub-DOM trees DOM1, DOM2 and gives each participated user device UD1, UD2 a sub-DOM tree DOM1, DOM2 according to a specification defined by a web application developer. After that, the browser on each user device UD1, UD2 receives a part of the entire web page and then presents it to the user U through a local rendering engine.

Once the user U starts to interact with the user devices UD1, UD2, all of the triggered events relevant for the document object model DOM will be captured and sent back to the virtual browser. The virtual browser further applies the collected DOM events into the virtual web page and updates the sub-views on the related user devices UD1, UD2. Also, the virtual browser manages the state of each sub-view DOM1, DOM2 and element. User devices UD1, UD2 are connected within the same document object model tree DOM0.

Figure 5:
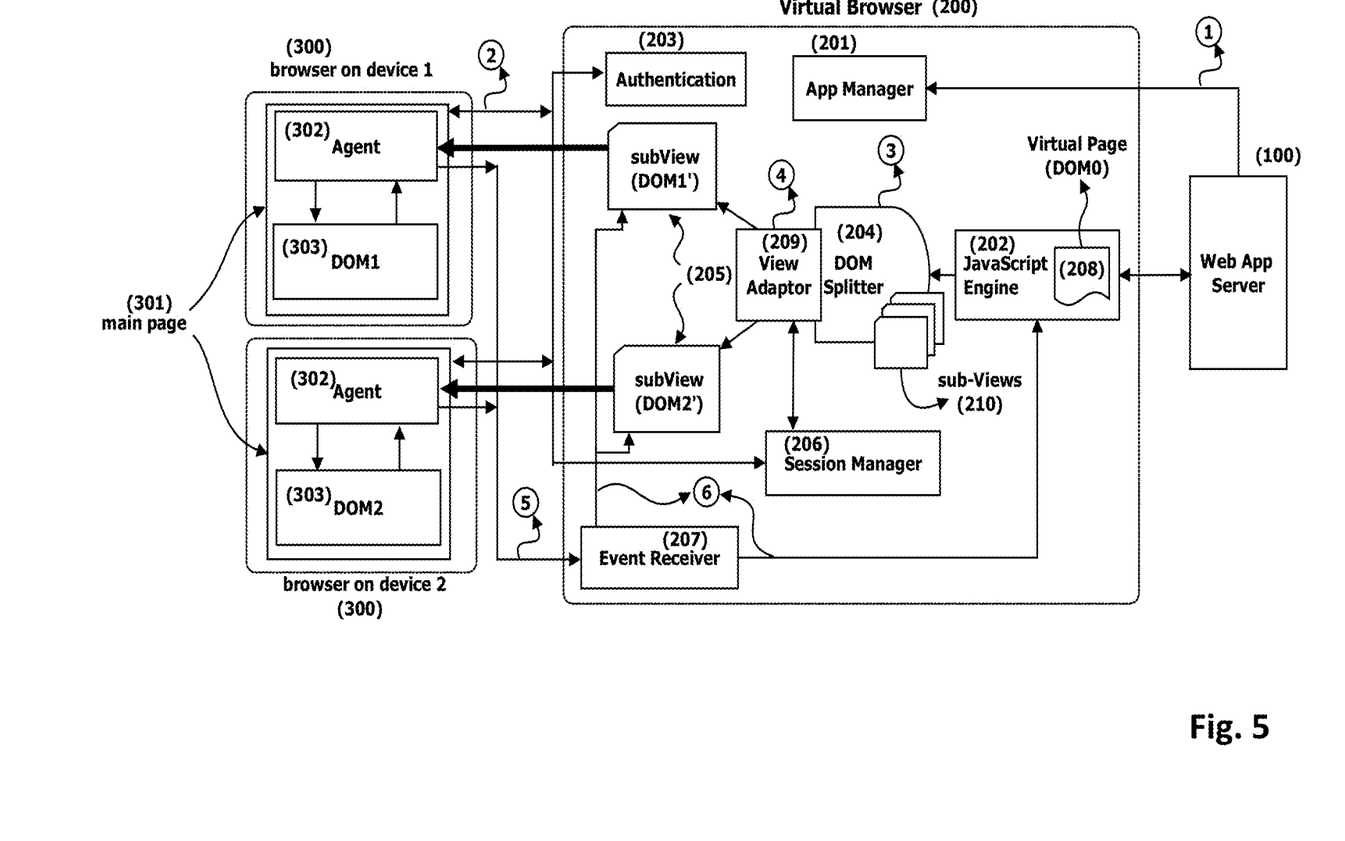
FIG. 5 illustrates a system according to a second embodiment of the present invention.

FIG. 5 shows a system according to a second embodiment of the present invention.

In FIG. 5, a diagram of a system architecture according to an embodiment of the present invention is shown. FIG. 5 shows thus a detailed system diagram of a multi-device web application platform based on a virtual browser principle on an intermediate device IM. The shown system comprises three parts: web application server 100, virtual browser 200, and normal browser on user devices 300. The web application server 100 provides the content of the original web pages for dealing with the major business logic within the web application. The virtual browser 200 acts preferably like a proxy, running between the web application server 100 and multiple user devices 200. For the web application server 100, the virtual browser 200 is just a normal browser. However, for the browsers on user devices 300, it acts as a web server. The virtual browser 200 can be deployed in the cloud together with the web application server 100, or be deployed at a smart home gateway in the user's house regarding to the user privacy concern.

Basically, the virtual browser 200 is responsible for dealing with the logic of cross-device operations, like element moving/duplicating, state maintaining/updating, and event sharing/synchronization. Each participated user device 300 is running a normal browser with an agent daemon 302 running inside. The agent daemon 302 is responsible for receiving content from the virtual browser 200, rendering the received content, capturing all DOM events and sending them back to the virtual browser 200.

First, web application developers design the code of the web application and deploy them on the web application server 100. Then the web application server 100 will register the deployed web application to an app(location) manager 201 that manages all of available multi-device web applications.

In a first step on each user device 300, a main web page 301 is loaded by a normal browser on user device 300. This main page is given and initialized by the virtual browser 200, containing an agent daemon 302 implemented in JavaScript JS and a DOM tree container 303, which can be a <div> element or a <iframe> element.

To access the content from the virtual browser 200, the agent daemon 302 on each participating user device 300 contacts with a session manager 206 to finish the authentication first. For the first joined user device 300, it creates a separate session with an authentication key. For the rest user devices, they can join the session by providing the same key. To authenticate each user device 300, a third parity authentication service 203 can be used here to assign an identical key to all user devices 300 in the same session. For example, an existing social network can be used as the authentication service. If the joined multiple user devices 300 belong to more than one user, say a group of users, those users have to share the same authenticate key with each other.

After the user devices 300 join the session, they can receive the list of all available applications. Then the user can choose one or more applications to use. Once a web application is first activated by the user on some user device, the virtual browser 200 will start to fetch the page content of this web application from the web application server 100. After that, the virtual browser 200 uses its own JavaScript engine 202 to execute the embedded JavaScript code within the page to generate a virtual web page 208, which is a DOM tree called DOM0. After the virtual web page is generated by the JavaScript engine 202, the DOM splitter 204 will start to parse the generated DOM tree DOM0 and split it into a list of sub-views 210. Each sub-view is a sub-DOM tree DOM1, DOM2 containing the elements to be displayed on a user device.

Given the list of sub-views DOM1, DOM2 separated by the DOM splitter 204 and the list of the currently available user devices 300 provided by the session manager 206, a view adaptor 210 is configured to decide which sub-view goes to which user device 300. Also, the view adaptor 210 will take into account the view specification defined in a header part of the virtual web page (cf. FIG. 6) The view specification is defined by the web application developer in need of adapting to a various number of user devices. For example, the view specification in FIG. 6 tells the view adaptor 209 to only show section 1 if only one user device 300 is available and to combine section 2 and 3 on one user device 300 if two user devices 300 are available. After the decision is made, the view adaptor 209 will generate a sub-view 205 for every available user device 300 and distribute the sub-view 205 to the corresponding user device 300.

After the agent daemon 302 on each user device 300 receives the corresponding sub-view DOM1, DOM2, it will update its DOM tree container and use the local rendering engine of its browser to present the received sub-view. Then the user on that user device 300 can start to interact with the presented content. At the same time, the agent daemon 302 starts to capture all DOM events triggered by user interactions, e.g., clicking, typing, and scrolling, and sends the captured events to the event receiver 207 for further processing. Also, the agent daemon 302 will monitor the state of each element in the sub-view and send back the latest state to the virtual browser. Therefore, the latest state of each element can be saved by its corresponding sub-view 205 within the virtual browser 200 and the virtual browser 200 can create the element with the latest state at any time in some sub-views DOM1, DOM2 for supporting cross-device element manipulation. For example, for the media elements, like <video> and <audio>, their latest states will be monitored and synchronized across multiple user devices 300.

The event receiver 207 receives the events and gives them to the JavaScript engine 208. The JavaScript engine 208 will apply these events into the virtual web page DOM0 to regenerate a new virtual web page DOM0'. Also, both the DOM splitter 204 and the view adaptor 209 will update the sub-views DOM1', DOM2' for each user device 300 and send out the incremental change of each sub-view DOM1', DOM2' to the involved agent daemon 302. The agent daemons 302 apply the change into their own DOM trees 303 and then the browsers will re-render the updated DOM tree DOM1', DOM2' to show the updated sub-view. On the other hand, the event receiver 207 also receives the element state reports and applies them to update the corresponding sub-view 205.

Figure 6:
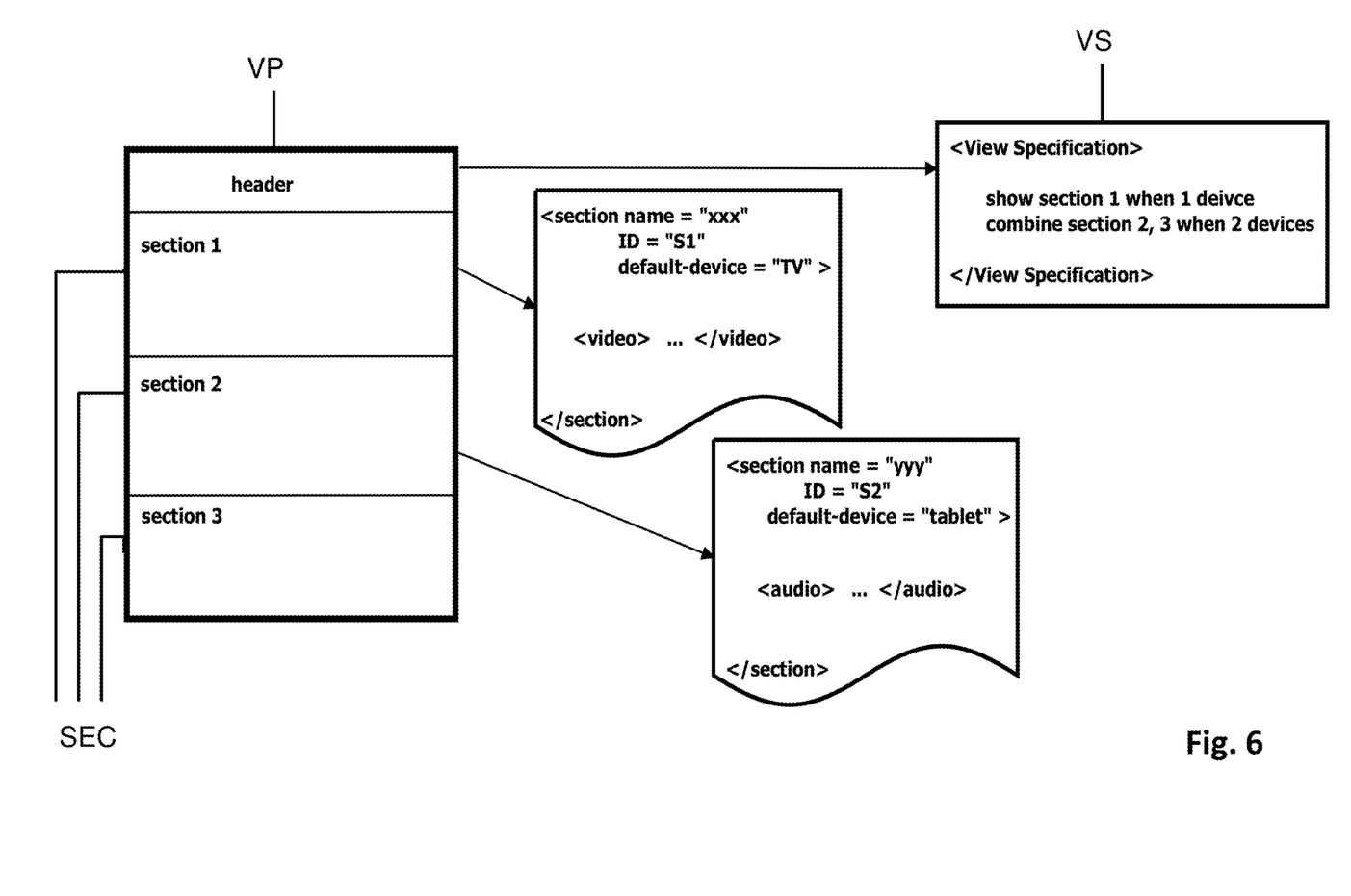
FIG. 6 illustrates part of a method according to a third embodiment of the present invention.

FIG. 6 shows part of the method according to a third embodiment of the present invention.

In FIG. 6, an example of a structure of a typical virtual page is shown. The entire virtual web page VP consists of a single header and several sections SEC. Each section SEC represents a sub-view of the entire web page for a certain user device 300. For example, in this particular example, the entire virtual web page VP includes one header and three sections SEC. According to the view specification VS, the first section 1 is named as "xxx" with identification ID "S1", suitable fora "TV" user device, with a <video> element inside. The second section 2 is named as "yyy" with identification ID "S2", suitable for a "tablet" user device, with a <audio> element inside. Since the <video> element and <audio> element are in the same web page, these two elements can be easily synchronized within the virtual browser 200. Using this type of virtual web page VP the video stream and the audio stream of the same video content can be split on two different devices. For example, the user can watch the video stream on a big TV while listening on the audio in his favorite language.

After the virtual web page VP is generated by the JavaScript engine 202, the DOM splitter 204 will start to parse the generated DOM tree DOM0 and split it into a list of sub-Views 210. Each sub-view 210 is a sub-DOM tree, including the elements to be displayed on a user device 300.

Figure 7:
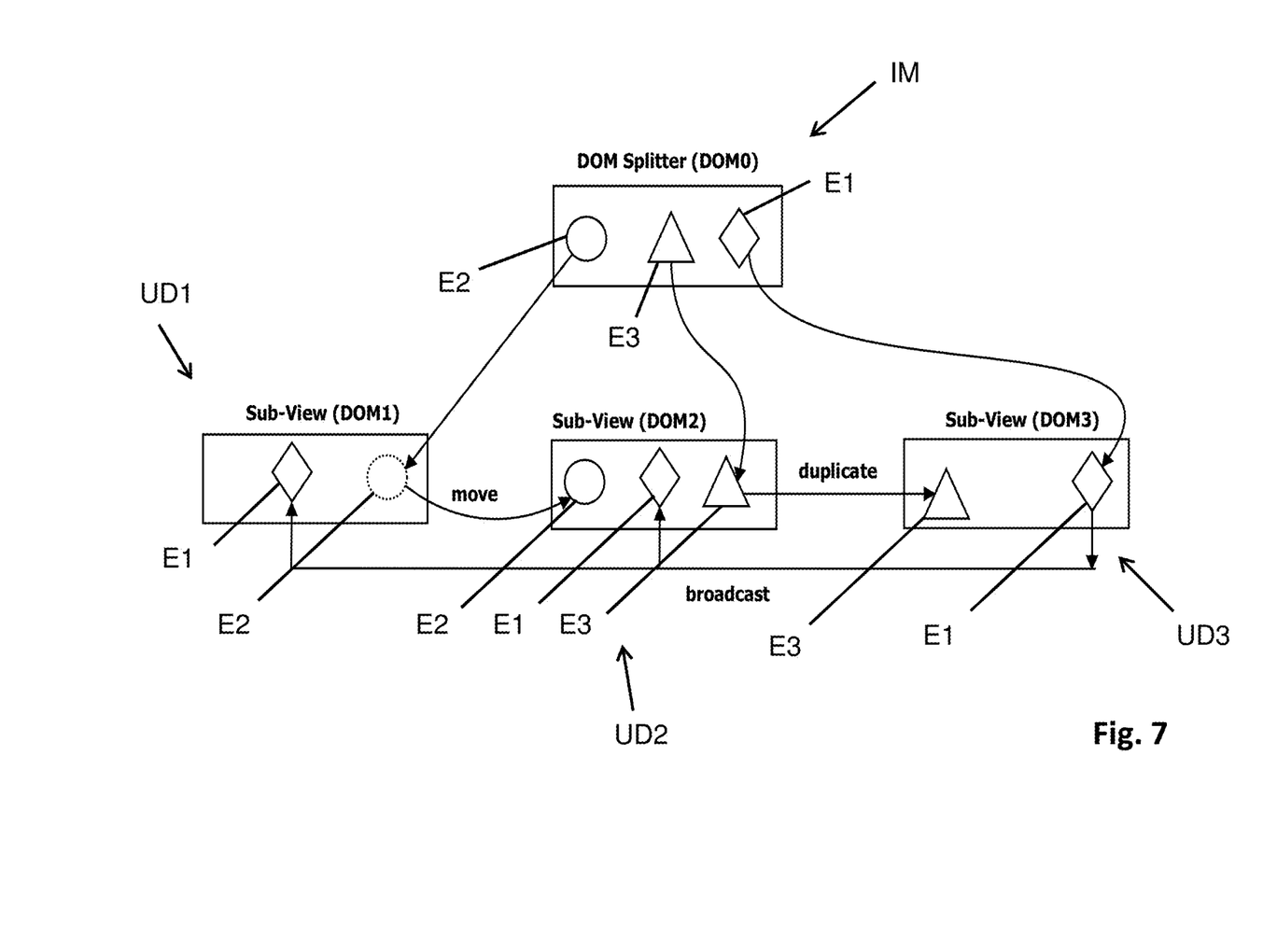
FIG. 7 illustrates part of a method according to a fourth embodiment of the present invention.

FIG. 7 shows part of the method according to a fourth embodiment of the present invention.

In FIG. 7, different cross-device-operations like element move, element duplicate and element broadcast is shown.

For example, moving an element from one user device UD1 to a second user device UD2 may be achieved by the following steps:

An element E2 first occurs on one user device UD1 and then disappears in that user device UD1, while appearing on another user device UD2 specified by the user, like the circle E2 shown in FIG. 7. For this operation, an element can only exist in one sub-view DOM1, DOM2, DOM3 at any time. To support this operation, the virtual browser 200 can move the element E2 from one sub-view DOM1 to another sub-view DOM2 while synchronizing and migrating the state of the moved element E2.

For duplicating an element of the following steps may be performed: An element E3 first occurs on one user device UD2 and then simultaneously appears on another user device UD3, like the triangle shown in FIG. 7. For this operation, the element E3 will be duplicated to exist in multiple sub-views DOM2, DOM3. To support this operation, the virtual browser 200 needs to create a shadow element E3 in the second user device UD3 and build a new mapping from the original element E3 to the shadow element E3. The original element E3 and the shadow element E3 can share the same ID and the virtual browser 200 can use this identical ID as the link to propagate any update associated with this element E3.

For element broadcasting the following steps are performed:

An element E1 initially belongs to only one sub-view DOM3, but later it occurs on all user devices UD1, UD2, UD3, like the diamond E1 shown in FIG. 7. This is an efficient way to share content on all user devices UD1, UD2, UD3. Like the element duplicate operation, the virtual browser 200 will create a shadow element E1 in all sub-views DOM1, DOM2, DOM3 and build a link between the original element E1 and all other shadow elements E1.

Figure 8:
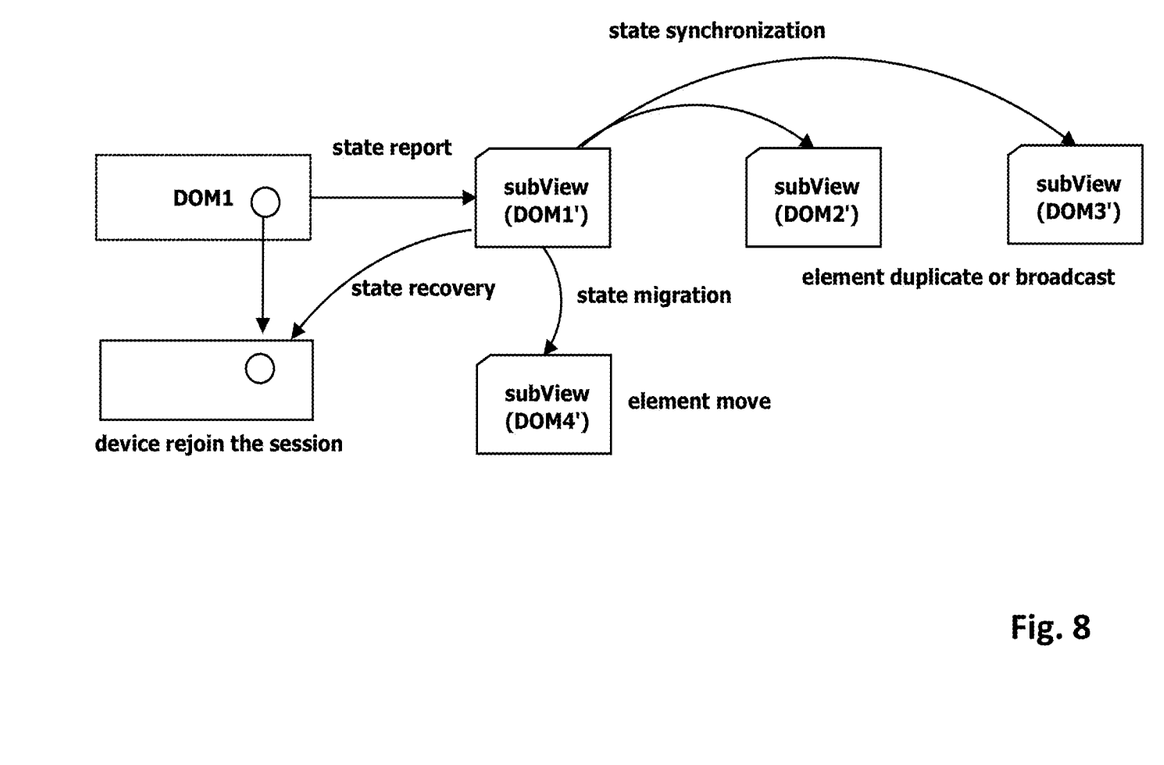
FIG. 8 illustrates part of a method according to a fifth embodiment of the present invention.

FIG. 8 shows part of the method according to a fifth embodiment of the present invention.

In FIG. 8, a diagram of an element state management is shown. The virtual browser 200 shares events and synchronizes the state of each element across thee multiple sub-views DOM1', DOM2', DOM3', DOM4'. Since the state of each element has been recorded by the virtual browser 200, the virtual browser 200 may easily recover the state of an element when the user uses the same user device to rejoin the same sub-view DOM1', DOM2', DOM3', DOM4' after certain time of interruption. The state of each element is migrated when the user moves the element from one user device UD1 to another user device UD2 and the state of an element across multiple sub-views DOM1', DOM2', DOM3', DOM4' is synchronized when the user duplicates or broadcasts the element to other user device.

In the details of FIG. 8, when an element is duplicated or broadcasted the state of the element in sub-view DOM1' is synchronized to the other sub-views DOM2', DOM3'. When an element is moved from sub-view DOM1' to DOM4' the state is migrated from the sub-view DOM1' to the sub-view DOM4'.

When a user device 300 wants to rejoin again an existing session the virtual browser 200 can easily recover the state of each element to rejoin the same sub-view.

The virtual browser 200 manages multiple sub-views DOM1', DOM2', DOM3', DOM4' and multiple user devices UD1, UD2, UD3, for either a single user U or a group of users U1, U2, U3. Within the virtual browser 200 the view adapter 210 decides which sub-view DOM1', DOM2', DOM3', DOM4' goes to which user device UD1, UD2, UD3 initially according to their view specification VS and the properties of each user device UD1, UD2, UD3, UD4. When new user devices UD1, UD2, UD3, UD4 join or existing user devices leave or users interact with each other this decision will be changed dynamically and thus the view adapter 210 is configured to support the following across-user-device-view-operations: view switch, view exchange and view recovering. During a view switch a user switches the view from one to another. When the view is exchanged two users exchange their views with each other and when a view recovering is performed a user first leaves a session from a user device and the joins the same session from the same user device again.

In summary the present invention enables a virtual browser run between web applications in multiple co-related devices providing a document object model splitter which can automatically split a single document object model tree in multiple sub-document object model trees. Further the present invention enables generation of a virtual web page generated by a javascript engine within the virtual browser comprising multiple sections each of which represents a sub-view of the whole web page on a particular user device. Further the present invention provides a session manager keeping the state of all established sessions, users and user devices. The session manager may integrate with existing social networks to authenticate the users and their user devices. Even further the present invention enables listing of sub-views separated by the document object model splitter and a list of the currently available user devices may be provided by the session manager, wherein a view adapter within the virtual browser may decide with sub-view goes to which user device with regard to the view specification defined in a header part of the virtual web page. Further the present invention provides an agent running within the user browser on each user device receiving the corresponding sub-views, uses the local browser rendering engine to present the received sub-view, monitors and reports the captured document object model events and the recorded element states to the virtual browser.

Even further the present invention provides and enables a virtual browser applying the received document object model events into the virtual web page, updating the corresponding sub-view and distributing the new change of each sub-view to the corresponding user device in an incremental way. Also the virtual browser may apply the received element state reports to update the corresponding sub-views.

The present invention further enables supporting cross-device operations including element move, element duplicate and element broadcast by sharing the events and synchronizing the state of each element across multiple sub-views. Even further the present invention provides and enables a view adapter within a virtual browser managing multiple sub-views on multiple devices for either a single user or a group of users. When new user devices join or existing user devices leave or users interact with each other, the view adapter may dynamically map a sub-view to a device for support across-device a view operations, like a view switch, or recovery for a single user and a view exchange between two users.

In summary the present invention enables a separation of page rendering and local workflow execution for a web application. Further the present invention enables an automatic splitting of a single document object model tree into multiple sub-document object model trees for multiple user devices and enables automatic supporting across-device element manipulations through event sharing and state synchronization across multiple user devices to provide a seamless across-device user experience. Even further the present invention enables a dynamic mapping of a sub-view to a user device to support across-device view operations.

One of the advantages of the present invention is that across-device-operations for multiple-device applications are enabled. The present invention further enables an easy implementation for support for cross-device operations enabling a similar multiple screen experience to a user and an increased quality of experience for the user.

Many modifications and other embodiments of the invention set forth herein will come to mind the one skilled in the art to which the invention pertains having the benefit of the teachings presented in the foregoing description and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method of providing for cross-device operations between user devices, the method comprising:
    maintaining, using an intermediate device connected to the user devices, state information on different elements in different sub-views displayed respectively on first and second ones of the user devices, the first and second user devices being different from each other; and
    performing at least one of:
        migrating and synchronizing the state of one of the elements which is moved from the sub-view of the first user device to the sub-view of the second user device, or
        generating a shadow element on the sub-view of the second user device and linking the shadow element to one of the elements on the first user device which is duplicated from the sub-view of the first user device on the sub-view of the second user device, and updating the states of the linked elements.

2. The method according to claim 1, further comprising broadcasting one of the elements of the first user device to the second user device and at least a third one of the user devices, such that the element of the first user device is duplicated in each of the second and third user devices.

3. The method according to claim 1, further comprising synchronizing the states of the elements based on a temporal breakdown of one of the user devices.

4. The method according to claim 1, further comprising:
requesting content for the user devices from an application server;
fetching the requested content;
executing the content;
generating, based on the executed content, a content tree;
splitting the generated content tree into different sub-views for the user devices; and
providing the different sub-views to the first and second user devices.

5. The method according to claim 4, further comprising updating the content tree or the sub-views based on a content change occurring on at least one of the user devices.

6. The method according to claim 4, wherein each of the steps is performed by the intermediate device.

7. The method according to claim 4, wherein the content tree comprises a header section and one or more device sections representing the different sub-views of the content tree for the user devices.

8. The method according to claim 4, further comprising receiving view information of the user devices and assigning the different sub-views to the first and second user devices respectively based on the view information.

9. The method according to claim 8, further comprising adapting the different sub-views for the user devices using the view information.

10. The method according to claim 1, wherein the intermediate device is deployed in a cloud system or at a smart home gateway.

11. The method according to claim 1, further comprising authenticating the user devices by a session information.

12. The method according to claim 11, further comprising generating the session information for the first user device connecting to the intermediate device, and providing the second user device with the generated session information for joining the session.

13. The method according to claim 1, wherein the different sub-views are sub-views of a same web page.

14. The method according to claim 13, wherein the user devices are different devices of a same user that requested the web page.

15. A system of providing for cross-device operations between user devices, the system comprising an intermediate device connected to the user devices and comprising one or more processors with access to at least one memory, which, alone or in combination, are configured to provide for execution of the following steps:
maintaining state information on different elements in different sub-views displayed respectively on first and second ones of the user devices, the first and second user devices being different from each other; and
performing at least one of:
migrating and synchronizing the state of one of the elements which is moved from the sub-view of the first user device to the sub-view of the second user device, or
generating a shadow element on the sub-view of the second user device and linking the shadow element to one of the elements on the first user device which is duplicated from the sub-view of the first user device on the sub-view of the second user device, and updating the states of the linked elements.

16. The system according to claim 15, further comprising an application server connected to the intermediate device and configured to provide content shown through the different sub-views.

17. The system according to claim 15, wherein the intermediate device is deployed in a cloud system or at a smart home gateway.

18. The system according to claim 15, wherein the different sub-views are sub-views of a same web page.

* * * * *